United States Patent
Bachurinskii et al.

(10) Patent No.: US 10,423,818 B2
(45) Date of Patent: Sep. 24, 2019

(54) APPARATUS FOR DETECTING CUTANEOUS IMPRINTS

(71) Applicant: Green Bit S.p.A., Grugliasco (Turin) (IT)

(72) Inventors: Andrei Bachurinskii, Grugliasco (IT); Davide Bozzato, Grugliasco (IT)

(73) Assignee: GREEN BIT S.P.A., Grugliasco (IT)

( * ) Notice: Subject to any disclaimer, the term of this patent is extended or adjusted under 35 U.S.C. 154(b) by 177 days.

(21) Appl. No.: 15/587,209

(22) Filed: May 4, 2017

(65) Prior Publication Data
US 2017/0364728 A1    Dec. 21, 2017

(30) Foreign Application Priority Data
Jun. 16, 2016    (IT) .................... 102016000062216

(51) Int. Cl.
G06K 9/00    (2006.01)
G06K 9/20    (2006.01)

(52) U.S. Cl.
CPC ......... G06K 9/0012 (2013.01); G06K 9/0004 (2013.01); G06K 9/00107 (2013.01); G06K 9/2027 (2013.01)

(58) Field of Classification Search
CPC .................... G06K 9/0012; G06K 9/2027
See application file for complete search history.

(56) References Cited

U.S. PATENT DOCUMENTS

| | | | |
|---|---|---|---|
| 2002/0131624 A1 | 9/2002 | Shapiro et al. | |
| 2007/0014443 A1* | 1/2007 | Russo | G06K 9/00114 382/124 |
| 2007/0177772 A1* | 8/2007 | Fujii | G06K 9/00114 382/115 |
| 2015/0016712 A1* | 1/2015 | Rhoads | G06K 9/00208 382/154 |
| 2017/0220838 A1* | 8/2017 | He | G06K 9/0004 |
| 2017/0270341 A1* | 9/2017 | Sun | G06K 9/00087 |

FOREIGN PATENT DOCUMENTS

| | | |
|---|---|---|
| EP | 0617919 A2 | 10/1994 |
| EP | 0749612 A1 | 12/1996 |
| EP | 2128795 A2 | 12/2009 |

OTHER PUBLICATIONS

Italian Search Report and Written Opinion dated Feb. 23, 2017 for Application No. ITUA20164438.

* cited by examiner

*Primary Examiner* — Oneal R Mistry
(74) *Attorney, Agent, or Firm* — Patterson + Sheridan, LLP

(57) ABSTRACT

An apparatus for detecting false fingerprints, comprising: an optical element having a detection surface on which at least one body is intended to be positioned, of which cutaneous imprints are intended to be detected, an anti-fake illuminator configured to generate at least one bright zone and at least one dark zone on said detection surface, an optical sensor arranged to capture light radiation reflected/diffused by said detection surface.

6 Claims, 4 Drawing Sheets

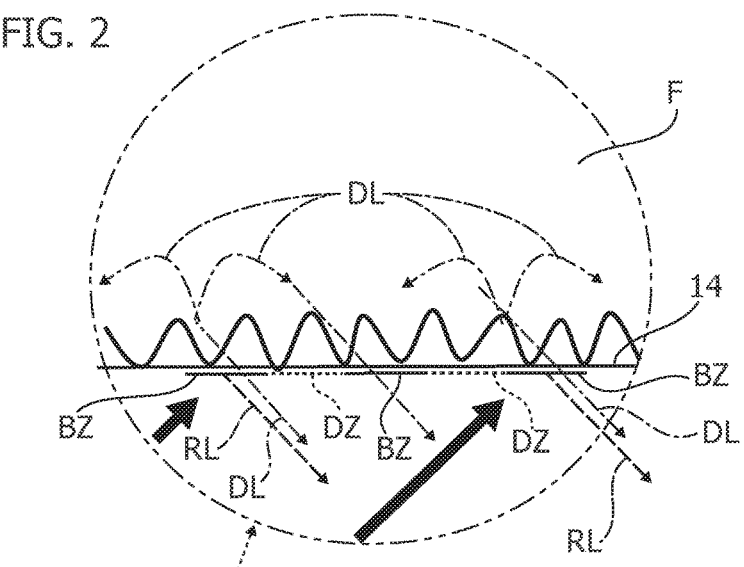
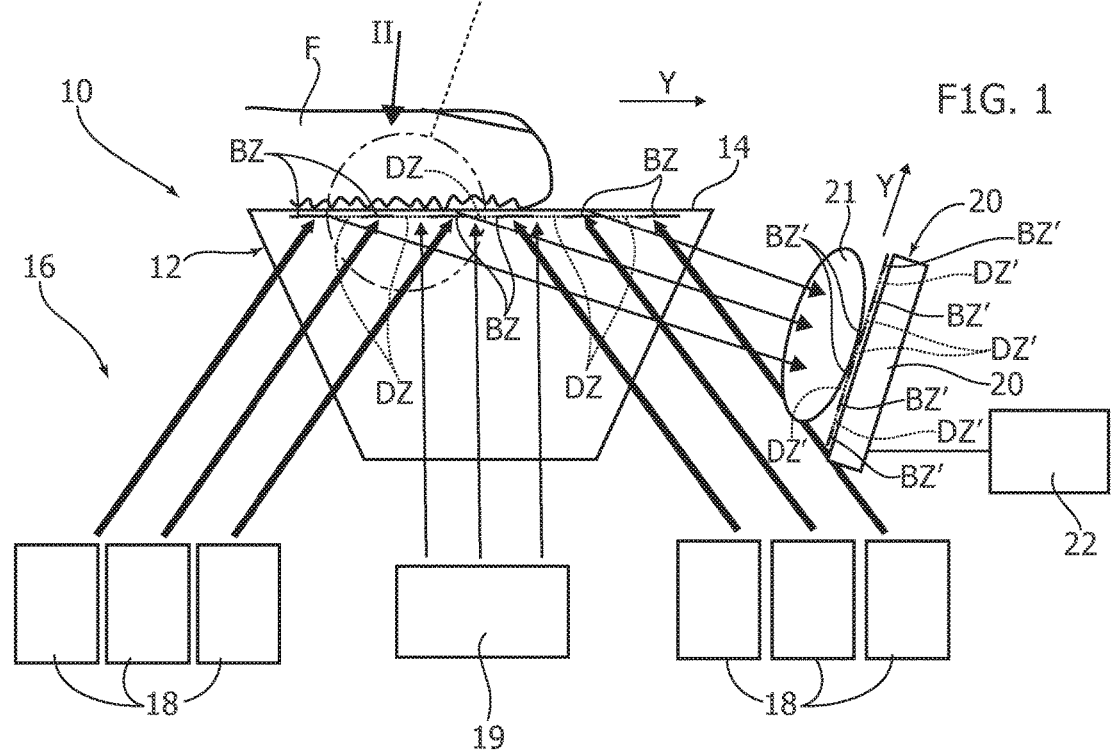

APPARATUS FOR DETECTING CUTANEOUS IMPRINTS

CROSS-REFERENCE TO RELATED APPLICATIONS

This application claims benefit of Italian patent application number 102016000062216, filed Jun. 16, 2016, which is herein incorporated by reference.

BACKGROUND OF THE INVENTION

Field of the Invention

The present invention relates to an apparatus for detecting cutaneous imprints.

The term "cutaneous imprint" is used here to indicate imprints such as fingerprints, palm imprints and, in general, any cutaneous imprint that can be used as biometric images, for example for identification purposes.

Description of Prior Art

The apparatuses for the optical scanning of cutaneous imprints envisage that one or more fingers or the palm of a hand are placed on an optical plate having a detection surface illuminated by an illumination source. An optical sensor captures the light radiation reflected or diffused from the detection surface. The analysis of the signal of the reflected image captured by the sensor allows identification of the trend of ridges and valleys, characteristic of the cutaneous imprint. The documents EP-A-0617919 and EP-A-0749612 are generically representative of optical scanning techniques of fingerprints.

Optical scanners of fingerprints that use the technique of reflected or diffused light to create an image of a fingerprint can be misled by false fingerprints that reproduce the three-dimensional relief of ridges/valleys of a fingerprint on various artificial substrates, which can be transparent (such as silicone or gelatin), non-transparent or semi-transparent (such as designs printed with laser or ink-jet printers on paper, wood, glue, etc.).

In practice, false imprints reproduced on a thin substrate and glued or attached to a surface of a real finger are the hardest to detect by optical systems.

In the state of the art, various technical solutions have been developed aimed at detecting false fingerprints. For example, the document US 2002/0131624 describes a device for detecting fingerprint images including an optical plate having a receiving surface on which a finger is placed. The fingerprint that rests on the receiving surface is illuminated by light coming from an illuminating device. Light beams reflected or diffused by the fingerprint are received by a sensor. This apparatus carries out the recognition of false imprints thanks to the fact that the position of an image coming from a false imprint has coordinates on the plane of the sensor that are different from the coordinates of an image coming from a true imprint.

The document EP-A-2128795 by the same Applicant describes a device for recognizing false cutaneous imprints comprising a source of light for sending a light beam to a detection surface comprising an illuminated zone and a shaded zone, a sensor that captures the light beam reflected from the detection surface, in which the reflected light beam comprises an illuminated zone and a shaded zone separated by a transition zone, and in which a processing circuit detects a signal indicative of the amplitude of the transition zone between the illuminated zone and the shaded zone of the reflected image and recognizes a false imprint when the transition zone has a width greater than a given reference value.

The solutions according to the prior art only provide reliable results in terms of recognizing false imprints in the case in which the false imprint is registered on a transparent substrate. The recognition of false imprints is not reliable, however, if the false imprint is registered on a non-transparent or semi-transparent layer.

SUMMARY OF THE INVENTION

The present invention aims to provide an apparatus for detecting cutaneous imprints that is capable of recognizing false imprints reproduced on transparent, semi-transparent and non-transparent artificial substrates applied to the surface of a true finger and even entire fake fingers.

According to the present invention, this object is achieved by an apparatus having the characteristics forming the subject of claim 1.

The apparatus according to the present invention comprises an anti-fake illuminator that creates alternating bright zones and dark zones on a detection surface. The light beams coming from the anti-fake illuminator penetrate directly into the body arranged on the detection surface in the bright zones, while in the dark zones there is no light coming from the illuminator that penetrates into the body. The light that penetrates into the body in the bright zones directly illuminated by the illuminator spreads within the tissue of the body arranged on the detection surface (true finger or fake fingerprint) and is reflected towards an optical sensor, creating a machine-readable image. The image detected by the optical sensor contains information coming from both the bright zones and the dark zones. From the dark zones, not illuminated directly by the illuminator, only the diffused light within the body arranged on the detection surface is detected by the optical system, while in the bright zones both the diffused light and the reflected light are detected. The image of the imprint received by the optical sensor is considered real if both the brightness of the bright zones and the brightness of the dark zones are included in predetermined reference ranges, different for the bright zones and for the dark zones. Otherwise, if at least one of the brightnesses in the bright zones and in the dark zones falls outside the predetermined reference ranges, the apparatus recognizes that the imprint is false.

The solution according to the present invention has the advantage over known solutions of allowing the recognition of false imprints registered on different types of media, namely transparent, semi-transparent or non-transparent, and even of entire fake fingers.

BRIEF DESCRIPTION OF THE DRAWINGS

The present invention will now be described in detail with reference to the attached drawings, given purely by way of non-limiting example, wherein:

FIG. 1 is a schematic view of an apparatus according to the present invention.

FIG. 2 is a schematic view of the detail indicated by the arrow II in FIG. 1.

DETAILED DESCRIPTION

Figure 3A:
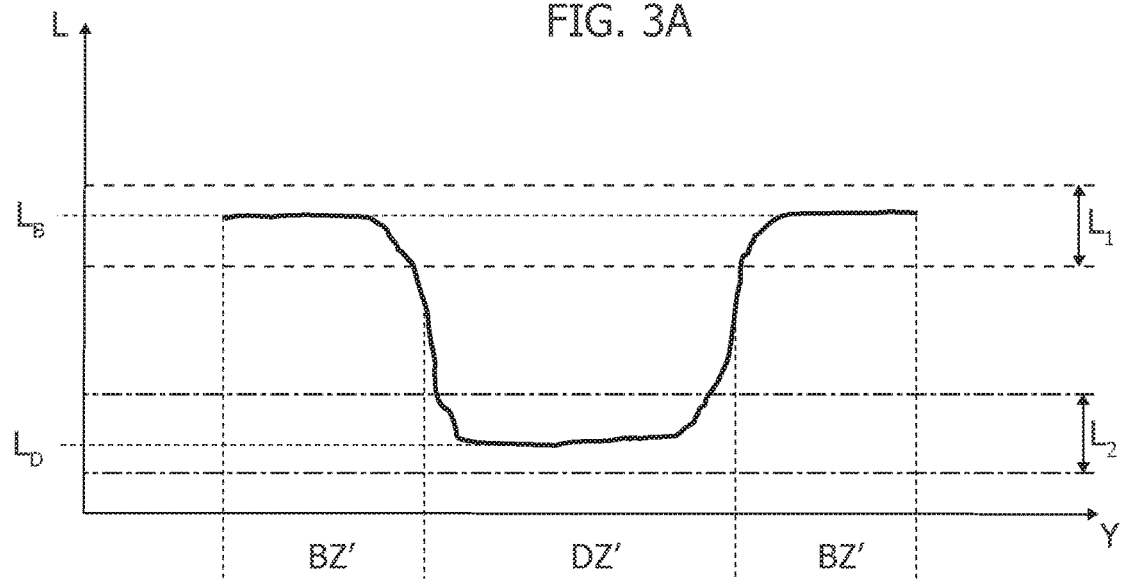
FIGS. 3a, 3b, 3c and 3d are graphs illustrating the light intensity detected by the optical sensor in the case of true fingers, and in the case of false fingerprints registered on transparent, non-transparent and semi-transparent material.

With reference to FIG. 1, numeral 10 schematically indicates an apparatus for detecting fingerprints. The apparatus 10 comprises an optical element 12, formed, for example, by a prism having a detection surface 14 on which at least one finger F is intended to be positioned.

An anti-fake illuminator 16 is arranged to generate at least one bright zone BZ and at least one dark zone DZ on the detection surface 14. In the illustrated example, the anti-fake illuminator 16 comprises a plurality of LEDs 18 associated with respective lenses that form a plurality of bright zones BZ, alternating with a plurality of dark zones DZ, on the reflecting surface 14 in the direction Y parallel to the longitudinal axis of the finger F. In FIGS. 1 and 2, the bright zones BZ are indicated schematically as continuous segments and the dark zones DZ are indicated by dashed lines.

The detection apparatus 10 comprises a detection illuminator 19 that illuminates the detection surface 14 in a uniform manner. The anti-fake illuminator 16 is used for the anti-fraud function, while the detection illuminator 19 is used for detecting images of the cutaneous imprints, according to conventional techniques in the field of detection apparatuses of cutaneous imprints.

The light radiation reflected by the detection surface 14 is captured by an optical sensor 20 formed, for example, by a CMOS sensor associated with a lens 21. The optical sensor 20 is associated with a processing unit 22, which is capable of forming an image of the fingerprint of the finger F on the basis of the light radiation captured by the optical sensor 20.

The same optical sensor 20 also receives the reflected/diffused optical radiation from the detection surface 14 coming from the anti-fake illuminator 16.

The anti-fake illuminator 16 can emit light radiation with a wavelength in a wide range of wavelengths, for example 380-750 nm. The best results from the point of view of recognizing false imprints are obtained using light radiation with a wavelength of 400-420 nm. For this wavelength, the effects of light diffusion into the skin or tissue of the fingers are minimal.

When a finger F is placed on the detection surface 14, the light radiation coming from the anti-fake illuminator 16 in the bright zones BZ is partially reflected by the detection surface 14 and partially diffused within the finger F. In FIG. 2, the reflected light RL is indicated by a dashed line and the diffused light DL is indicated with a dashed and dotted line. From the dark zones DZ of the reflecting surface 14, not directly illuminated by the anti-fake illuminator 16, only the light DL diffused within the body resting on the detection surface 14 is detected by the sensor 20, while from the bright zones BZ of the detection surface 14 directly illuminated by the anti-fake illuminator 16, both the reflected light RL and the diffused light DL is detected by the sensor 20.

On the sensor surface 20, dark zones DZ' and bright zones BZ' are identified, corresponding to the bright zones BZ and dark zones DZ of the reflecting surface 14.

The processing unit 22 receives the signals coming from the optical sensor 22 and analyzes the intensity of the light radiation in the bright zones BZ' and in the dark zones DZ' of the sensor 20. The processing unit 20 compares the average light intensity in the bright zones BZ' and in the dark zones DZ' of the sensor 20 with reference ranges of average brightness of real fingers previously detected.

In the graphs of FIGS. 3a, 3b, 3c, and 3d, L1 and L2 indicate the reference ranges, different from each other, of the average light intensity for real fingers in the dark zones DZ' (LD) and in the bright zones BZ' (LB). The graphs show the average light intensity detected by the optical sensor 20 along the axis Y of the sensor 20.

The imprint is considered real if the average brightness LB detected in the bright zones BZ' and the average brightness LD detected in the dark zones DZ' of the sensor 20 are included within respective predetermined reference ranges L1 and L2.

FIG. 3a illustrates the average light intensity detected for a real finger. In this case, both the brightnesses LB and LD are included in the respective reference ranges L1 and L2.

If the average light intensity LB detected on the sensor 20 in the bright zones BZ' or the average light intensity LD in the dark zones DZ' of the sensor 20 is outside the corresponding predetermined reference ranges L1, L2, then the imprint is detected as false.

Figure 3B:
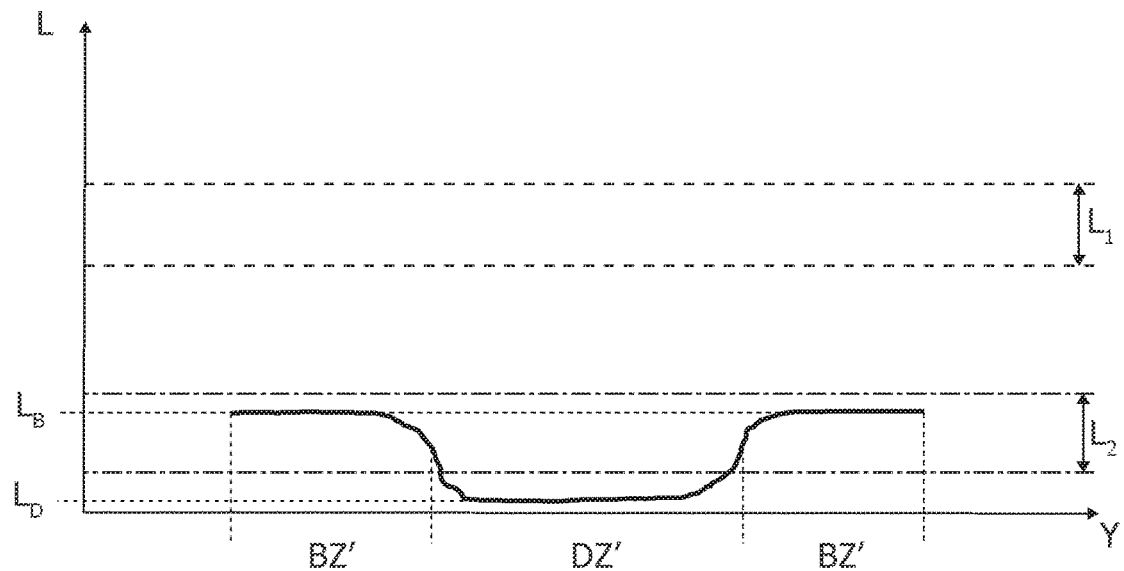

FIG. 3b illustrates the graph of the average brightness for a false imprint formed on a transparent artificial material. In this case, the absorption of the light within the material is low so that the light diffuses very well, providing a large amount of light reflected towards the sensor 20, both from the bright zones BZ' and from the dark zones DZ'. In this case, the average light intensity values LB, LD are higher than the predetermined reference ranges L1, L2, both for the bright zones BZ' and for the dark zones DZ'.

Figure 3C:
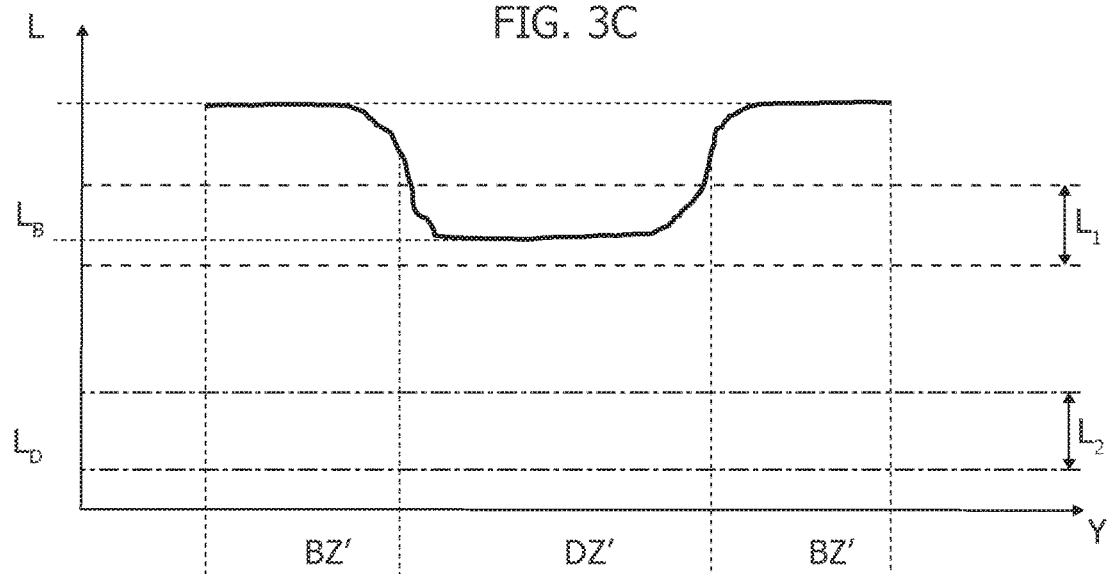

FIG. 3c shows the graph of the average light intensity for false imprints formed on a non-transparent material. In this case, the amount of light coming from the dark zones is very low because the light coming from the anti-fake illuminator 16 is mainly absorbed by the material and the diffusion within the material is almost absent. The amount of light reflected from the bright zones is also low because of the high absorption. The average light intensity values LB, LD are lower than the predetermined reference ranges L1, L2, both for the bright zones BZ' and for the dark zones DZ'.

Figure 3D:
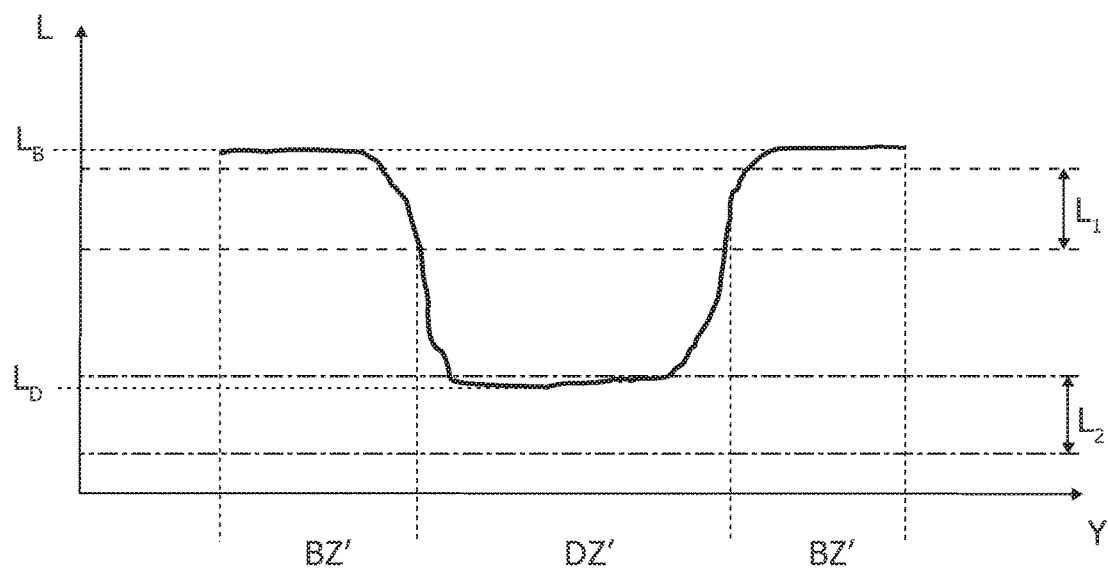

FIG. 3d illustrates the average brightness detected on the sensor 20 for false imprints formed on semi-transparent materials. Semi-transparent materials have a different ratio between the light intensity LB, LD coming from the bright zones BZ' and from the dark zones DZ' depending on the particular characteristics of the material. In this case, it is possible that the average light intensity LD of the dark zones is within the predetermined reference range L2, and the average intensity LB in the bright zones is outside the predetermined reference range L1, or vice versa. By way of example, in FIG. 3d, the case is illustrated in which the average light intensity LB in the bright zones BZ' is greater than the range L1 and the average light intensity LD in the dark zones DZ' is within the range L2. In this case, the accuracy of the detection of the false imprint depends on a setup of the system parameters based on a preliminary calibration of the system using real imprints.

To increase the accuracy of the detection, the apparatus according to the present invention can be configured to carry out the recognition of true or false imprints based on the verification of two conditions. In this case, the imprint is considered true if:

1) if the average brightness LB detected in the bright zones BZ' and the average brightness LD detected in the dark zones DZ' of the sensor 20 are included within respective predetermined reference ranges L1 and L2; and 2) the ratio between the average light intensity LB of each bright zone BZ' and the average light intensity LD of an adjacent dark zone DZ' is within a predetermined reference range.

Condition 2) is useful in some cases since condition 1) has relatively large reference fields to avoid recognizing detections made on fingers with extremely dry or extremely moist skin as false.

Figure 4:
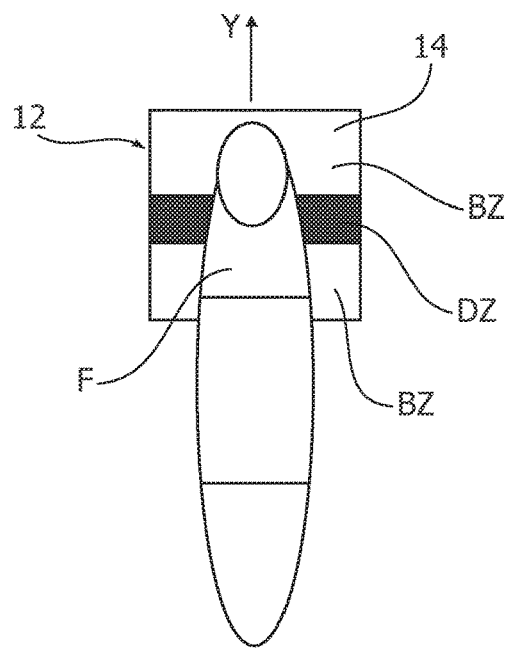
FIG. 4 is a plan view of an optical scanner for a single finger.
Figure 5:
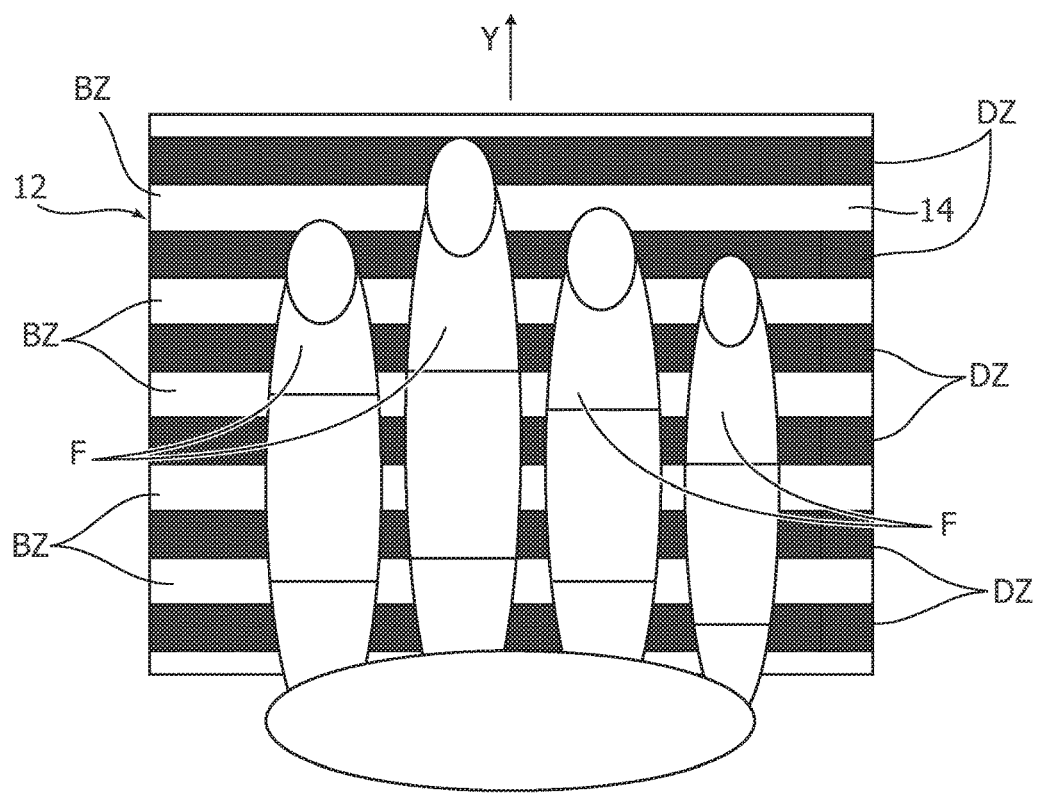
FIG. 5 is a plan view of an optical scanner for multiple imprints.

The dimensions of the illuminated zones BZ and of the dark zones DZ are selected to ensure that at least one dark zone DZ is completely contained within the height of the scanning area of a phalanx of a finger, regardless of the position of the fingers in the scanning area. The method according to the invention can be applied to scanners for a single finger (FIG. 4) and to scanners for multiple imprints, such as, for example, 10-fingerprint scanners and palm scanners (FIG. 5). In palm scanners, there are no positioning problems due to the large scanning area. As illustrated in FIGS. 4 and 5, the bright zones BZ and the dark zones DZ have the shape of parallel strips on the detection surface 14, orthogonal to the Y direction.

The false cutaneous imprint detection procedure consists in positioning at least one finger on the scanning surface 14, illuminating the scanning surface 14 by means of the anti-fake illuminator 16 with alternating bright zones BZ and dark zones DZ in a direction Y, detecting, by means of the optical sensor 20, the light intensity reflected/diffused in bright zones and dark zones BZ', DZ' of the sensor 20 corresponding to the bright zones and dark zones, BZ, DZ of the detection surface 14, and comparing the average light intensity LB, LD in the bright zones BZ' and in the dark zones DZ' with respective predetermined reference ranges L1, L2. The imprint is recognized as true only when both the average light intensity LB in the bright zones BZ', and the average light intensity LD in the dark zones DZ', is contained within the respective predetermined reference ranges L1, L2.

After an imprint has been recognized as true, the anti-fake illuminator 16 is deactivated, and the detection of an image of the imprint proceeds by activating the detection illuminator 19 and detecting the image of the imprint via the sensor 20.

Alternatively, the anti-fake illuminator 16 and the detection illuminator 19 can be activated simultaneously. In this case, the two illuminators have different emission frequencies, for example, the anti-fake illuminator 16 consists of blue LEDs and the detection illuminator 19 of red LEDs.

Of course, without prejudice to the principle of the invention, the details of construction and the embodiments can be widely varied with respect to those described and illustrated, without thereby departing from the scope of the invention as defined by the claims that follow.

The invention claimed is:

1. An apparatus for detecting false fingerprints, comprising:
    an optical element having a detection surface on which at least one body is intended to be positioned, of which cutaneous imprints are intended to be detected;
    an anti-fake illuminator configured to generate at least one bright zone and at least one dark zone on said detection surface;
    an optical sensor arranged to capture light radiation reflected/diffused by said detection surface, wherein at least one bright zone and at least one dark zone are detectable on the optical sensor, corresponding to said at least one bright zone and to said at least one dark zone of said detection surface; and
    a processing unit that receives signals coming from said optical sensor and arranged to compare the average light intensity in said at least one bright zone and the average light intensity in said at least one dark zone of the optical sensor with respective predetermined reference ranges, and wherein the processing unit is configured to recognize a true cutaneous imprint when the average light intensity in said at least one bright zone and the average light intensity in said at least one dark zone of the optical sensor are contained within respective predetermined reference ranges,
    wherein said anti-fake illuminator emits light radiation with a wavelength between 380 and 750 nm.

2. An apparatus according to claim 1, wherein the processing unit is also configured to recognize true cutaneous imprints when the ratio of the average light intensity of said at least one bright zone and the average light intensity of said at least one adjacent dark zone is comprised in a predetermined reference range.

3. An apparatus according to claim 1, wherein said anti-fake illuminator emits light radiation with a wavelength between 400 and 420 nm.

4. An apparatus according to claim 1, wherein at least one dark zone is included between two bright zones.

5. An apparatus according to claim 1, wherein said anti-fake illuminator is arranged to form a plurality of bright zones and a plurality of dark zones on said detection surface, having the shape of parallel strips.

6. An apparatus according to claim 4, wherein at least one dark zone is completely contained within the height of the scanning area of a phalanx of a finger.

* * * * *